United States Patent [19]

Weder et al.

[11] Patent Number: 5,238,382
[45] Date of Patent: Aug. 24, 1993

[54] SHEET FED ARTICLE FORMING SYSTEM

[75] Inventors: Donald E. Weder, Highland, Ill.;
Franklin J. Craig, Valley Park, Mo.

[73] Assignee: Highland Supply Corporation, Highland, Ill.

[21] Appl. No.: 747,778

[22] Filed: Aug. 20, 1991

[51] Int. Cl.⁵ .............................................. B29C 31/08
[52] U.S. Cl. ......................................... 425/150; 271/7; 271/95; 425/398
[58] Field of Search ..................... 264/40.2; 425/126.1, 425/145, 161, 149, 397, 400, 444, 387, 436 R, 387.1, 388, 150, 398; 271/94-96, 7

[56] References Cited

U.S. PATENT DOCUMENTS

| | | | |
|---|---|---|---|
| 3,105,270 | 10/1963 | Fibish | 425/145 |
| 3,228,066 | 1/1966 | Rippstein | 425/397 |
| 3,465,384 | 9/1969 | Barchi et al. | 264/40.2 |
| 3,674,399 | 7/1972 | Sendor | 264/40.2 |
| 3,973,888 | 8/1976 | Hehl | 425/126.1 |
| 4,106,884 | 8/1978 | Jegelka | 425/444 |
| 4,440,702 | 4/1984 | Susnjara | 425/397 |
| 4,479,914 | 10/1984 | Baumrucker | 425/444 |
| 4,755,128 | 7/1988 | Alexander | 425/444 |
| 4,778,372 | 10/1988 | Mutti et al. | 425/397 |
| 4,887,805 | 12/1989 | Herbert et al. | 271/94 |
| 4,889,331 | 12/1989 | Sardella | 271/94 |
| 4,939,350 | 7/1990 | Sauer | 271/94 |
| 4,963,087 | 10/1990 | Aida et al. | 425/556 |
| 5,014,972 | 5/1991 | Anderson et al. | 271/94 |
| 5,044,918 | 9/1991 | Brüssel | 425/444 |
| 5,052,675 | 10/1991 | Shebata et al. | 271/94 |
| 5,090,676 | 2/1992 | Matsuno et al. | 271/94 |

Primary Examiner—Richard L. Chiesa
Attorney, Agent, or Firm—Dunlap, Codding, Lee

[57] ABSTRACT

An article forming system for forming at least one sheet of material into an article, such as a decorative flower pot cover for example. The article forming system includes a male die and a female die. A sheet of material is automatically moved to a loaded position between the male and female dies and then the male and female dies are moved to a forming position for forming the article. The formed articles are automatically stacked.

3 Claims, 6 Drawing Sheets

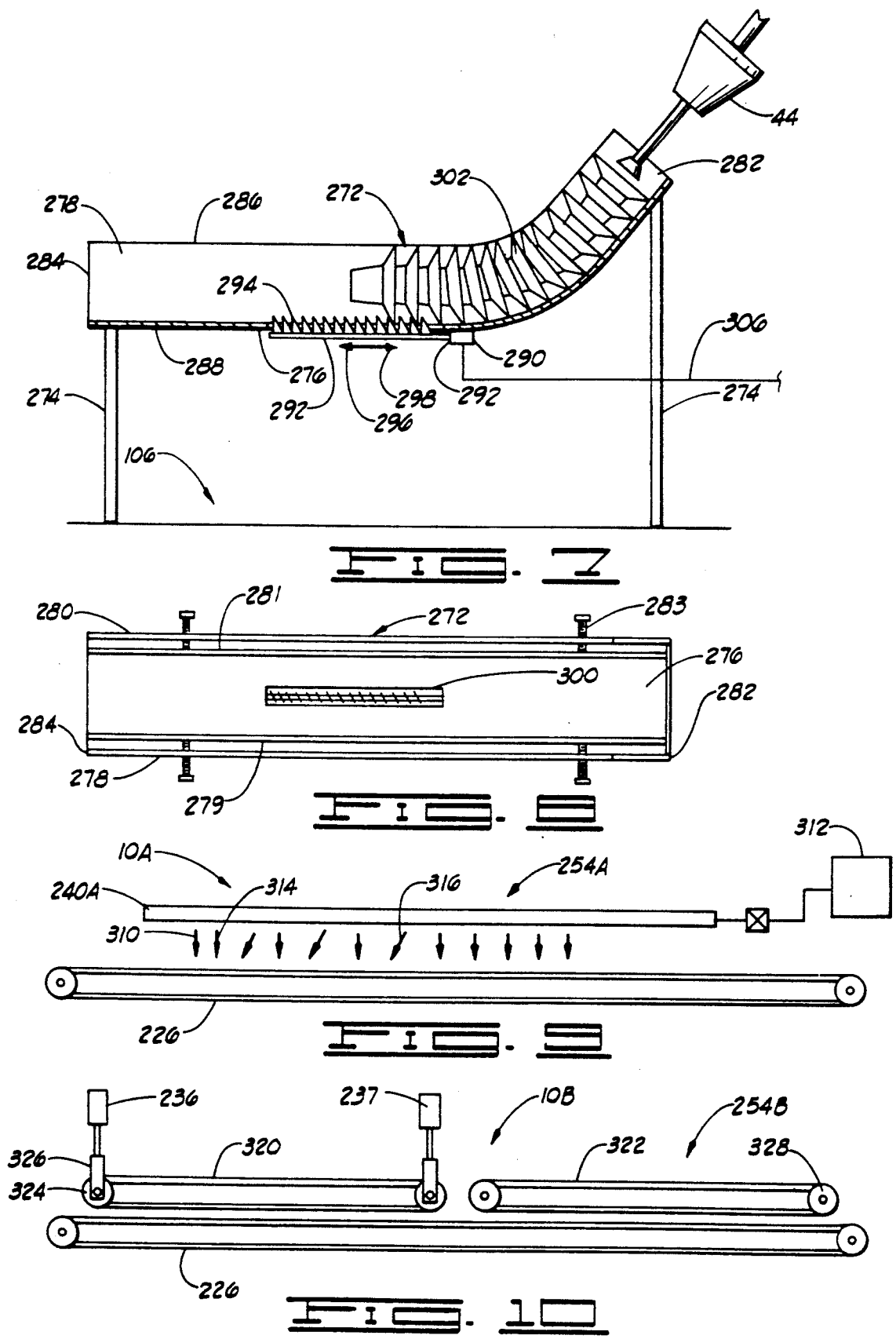

SHEET FED ARTICLE FORMING SYSTEM

FIELD OF THE INVENTION

The present invention relates generally to an article forming system and more particularly, but not by way of limitation, to an article forming system for moving sheets of material from a loading position to a loaded position, forming an article like a decorative flower pot cover and stacking the formed article.

BRIEF DESCRIPTION OF THE DRAWINGS

FIG. 1A is an enlarged schematic side elevational view of the male die of FIG. 1.

FIG. 1B is an enlarged schematic plan view of the female die and support surface of FIG. 1.

FIG. 7 is a schematic side elevation of the formed article stacking portion of the article forming system of FIG. 1.

FIG. 8 is a schematic plan view of the portion of the article forming system shown in FIG. 7.

FIG. 9 is a schematic elevational view of a portion of a modified article forming system.

FIG. 10 is a schematic elevational view of a portion of another modified article forming system.

DESCRIPTION OF THE PREFERRED EMBODIMENTS

Figure 1:
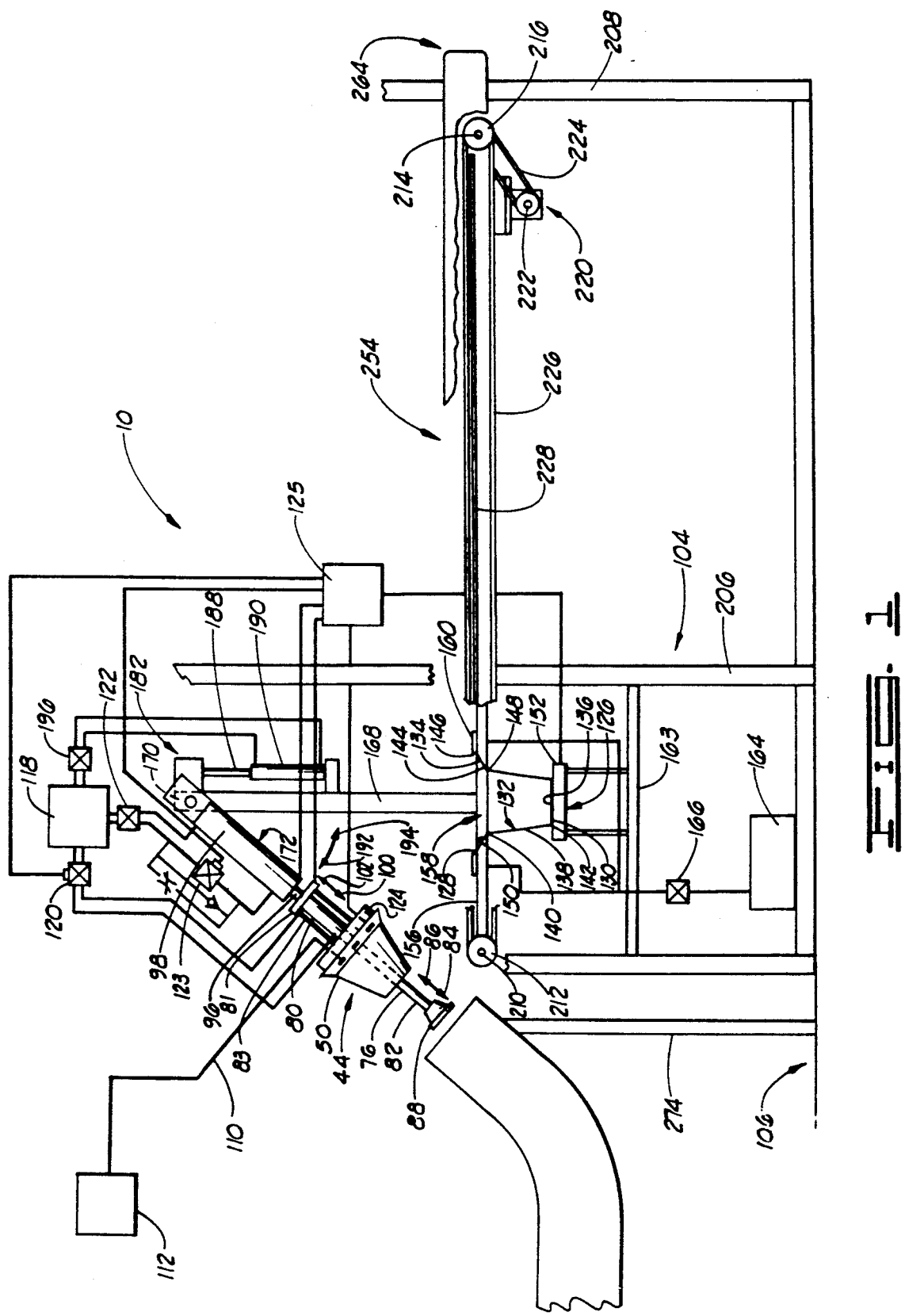
FIG. 1 is a schematic side elevational view of an article forming system which is constructed in accordance with the present invention.
Figure 2:
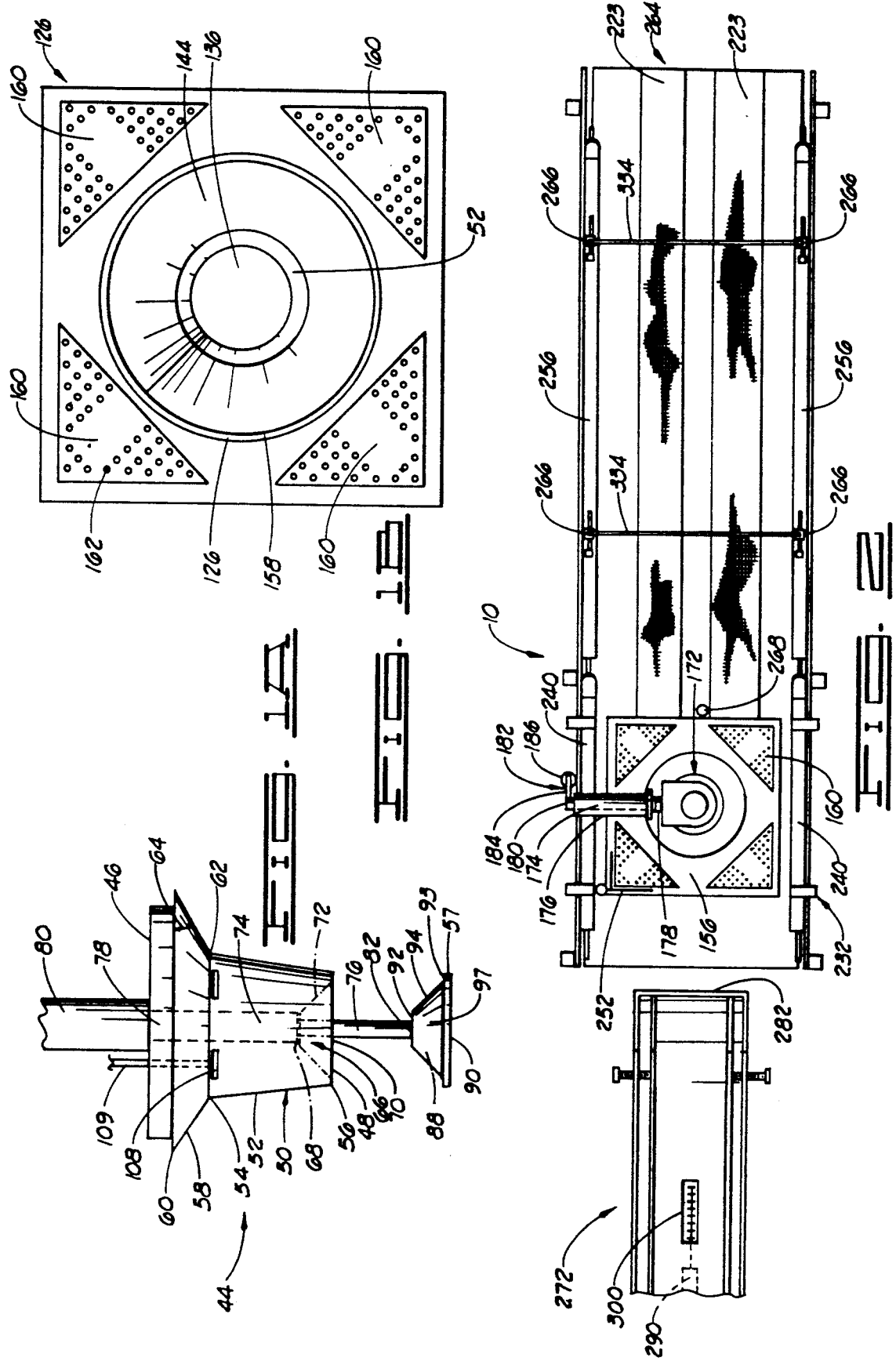
FIG. 2 is a schematic plan view of the article forming system of FIG. 1.

Shown in FIGS. 1 and 2 is an article forming system 10 which is constructed in accordance with the present invention. The article forming system 10 is adapted to form at least one sheet of material into an article having a predetermined shape, a sheet of material 12 being shown in FIGS. 3 and 4 formed into a decorative flower pot cover article 14 for a flower pot 16, the flower pot 16 being shown in dashed lines in FIG. 3.

It should be noted that the present invention is described herein a being adapted to form the sheet of material 12 into the predetermined shape of a decorative flower pot cover type of article since one extremely advantageous use of the system of the present invention is to form such decorative flower pot cover types of articles. However, a decorative flower pot cover represents only one article which can be formed into a predetermined shape in accordance with the present invention and the present invention specifically contemplates various and numerous other types of articles such as vases, hats, saucers, easter baskets, containers for use in microwave ovens, rose stem boxes, egg cartons, potting trays pans, trays, bowls, basket liners, candy trays, drinking cups, candy cups, flower pots, planter trays for growing plants, disposable bowls and dishes, corsage boxes and containers, food service trays (such as those used for bakery goods, french fries, ground beef, liver and other raw meats in supermarkets, for example), boxes for hamburgers or pies and the like, and various other articles. The term "article" as used herein is intended to encompass all of the specific articles just mentioned and the term "article" also is intended to be broad enough to encompass any other article having a predetermined shape where the article to function must be capable of substantially maintaining such predetermined shape.

The present invention particularly contemplates articles being formed into a predetermined shape from a sheet of material having a relatively small thickness and being of the type commonly referred to in the art as a "film". Examples of some materials which are suitable for making sheets are aluminum foil, cloth, burlap, paper, or a man-made organic polymer such as polypropylene. The sheet of material contemplated by the present invention is relatively thin having a thickness less than about 3 mills, however, if cloth or burlap is used, the thickness could be 1/32" or more. The sheet of material is generally very flexible and flimsy so that the sheet of material will not normally maintain or hold a predetermined formed shape under normal, usual conditions (non-shape sustaining).

In some instances and for various reasons, it may be desirable to utilize more than one sheet of material and, in these instances, the sheets of material are layered, placed one on the other, when the sheets of material are formed into the predetermined shape to form the desired article. The present invention provides a means for forming a sheet of material of the type just described into a predetermined shape so the formed sheet of material substantially retains or maintains the formed shape thereby providing a means for making articles from such sheets of material in a more economical manner.

Figure 3:
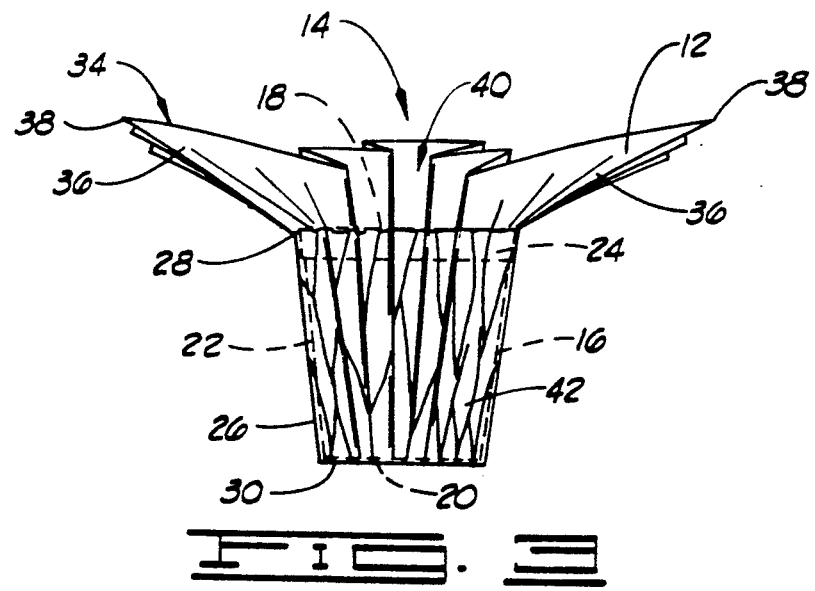
FIG. 3 is a side elevational view of a flower pot cover article formed using the article forming system of FIGS. 1 and 2, and also showing a portion of a flower pot object (shown in dashed lines) with the flower pot cover article being operatively disposed on such flower pot object.

As shown in dashed lines in FIG. 3, the flower pot object 16 has an upper end 18, a lower end 20 and an outer peripheral surface 22. In the embodiment of the flower pot object 16 shown in FIG. 3, the diameter of the flower pot object 16, generally near the lower end 20, is less than the diameter of the flower pot object 16, generally near the upper end 18, the flower pot object 16 tapering outwardly generally from the lower end 20 toward the upper end 18 thereby giving the flower pot object 16 a generally overall frusto-conically shaped outer peripheral surface 22. In this embodiment, the flower pot object 16 includes a rim 24 formed at the upper end 18 which extends circumferentially about the flower pot object 16, although it should be noted that some flower pot objects do not include a rim and flower pots also have various shapes as generally well known, and the present invention is not limited to any particular shape of a flower pot.

Figure 4:
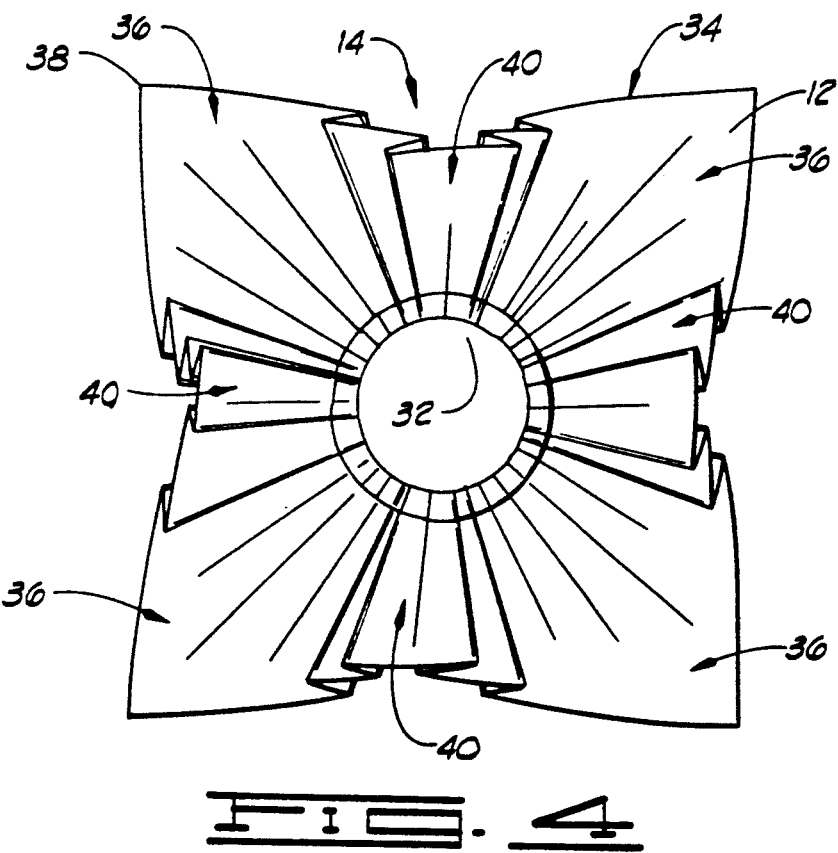
FIG. 4 is a top plan view of the flower pot cover article of FIG. 3.

In this description a generally square shaped sheet of material having four corners will be used. However, it should be noted that any of various shapes of sheets of material may be used with this invention. For example, the sheet of material may be round, round and scalloped, triangular, rectangular or even die cut to various unsymmetrical shapes. As shown in FIGS. 3 and 4, the decorative flower pot cover article 14 formed from the generally square-shaped sheet of material 12 utilizing the system 10 of the present invention includes a base 26 having an opened upper end 28, a closed lower end 30, an object opening 32 extending through the upper end 28 and a decorative border 34 which extends angularly upwardly and outwardly from the upper end 28 of the base 26.

The decorative border 34 includes four accentuated and sculptured flared petal-like portions 36, each flared petal-like portion 36 terminating with a pointed end 38 which is formed by one of the four corners of the square-shaped sheet of material 12. In this example, each flared petal-like portion 36 extends a distance angularly upwardly and outwardly from the upper end 28 of the base 26 terminating with the pointed end 38. The flared petal-like portions 36 are spaced apart circumferentially about the decorative border 34 with the flared petal-like portions 36 being spaced at about ninety degree intervals, and a flare connecting portion 40 is disposed between each pair of adjacent flared portions 36, the flare connecting portions 40 also each extending a distance angularly upwardly and outwardly from the upper end 28 of the base 26 which is less than the distances which the pointed ends 38 of the flared portions 36 extend from the upper end 28 of the base 26.

The object opening 32 in the decorative flower pot cover 14 is shaped and sized to receive the flower pot object 16. When the flower pot 16 is operatively disposed in the object opening 32 of the decorative flower pot cover 14, as shown in FIG. 3, the base 26 substantially encompasses the outer peripheral surface 22 of the flower pot 16 extending generally between the upper and the lower ends 18 and 20 of the flower pot 16, with the upper end 28 of the base 26 being disposed generally near the upper end 18 of the flower pot 16 and the lower end 30 of the decorative flower pot cover 14 being disposed generally near the lower end 20 of the flower pot 16, the closed lower end 30 of the decorative flower pot cover 14 extending across and encompassing the lower end 20 of the flower pot 16. In this position with the decorative flower pot cover 14 operatively connected to the flower pot 16, the decorative border 34 of the decorative flower pot cover 14 extends a distance angularly upwardly and outwardly from the upper end 18 of the flower pot 16 and the decorative flower pot cover 14 extends generally circumferentially about the upper end 18 portion of the flower pot 16.

Figure 5:
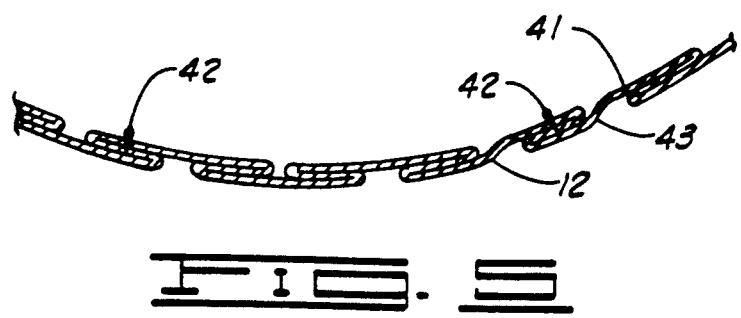
FIG. 5 is a sectional view of a portion of the base of the flower pot cover article of FIGS. 3 and 4 showing some of the 24 overlapping folds.

As shown in FIGS. 3 and 5, the base 26 of the decorative flower pot cover 14 formed utilizing the system 10 of the present invention includes a plurality of overlapping folds 42 (only some of the overlapping folds 42 being designated by a reference numeral in the drawings). A substantial portion of the overlapping folds 42 extend at angles to a vertical direction and at angles to a horizontal direction, the various angles being arbitrary and varying from one overlapping fold 42 to another overlapping fold 42. Further, the base 26 includes a plurality of overlapping folds 42 with the various overlapping folds 42 being positioned at various positions about the entire outer peripheral surface of the base 26 and at various positions between the upper and the lower ends 28 and 30 of the base 26. The overlapping folds 42 provide an overall decorative appearance to the base 26; however, more significantly, the overlapping folds 42 provide a mechanical strength to the base 26 for enabling the base 26 to stand upright (substantially retain the shape formed by the system 10 of the present invention) on the close lower end 30 of the base 26. In this manner, the base 26 of the decorative flower pot cover 14 has sufficient mechanical strength to stand upright about the flower pot 16 without the necessity of mechanically connecting the base 26 to the flower pot 16, other than the connection normally provided when the lower end 20 of the flower pot 16 engage the lower end 30 of the decorative flower pot cover 14 when the decorative flower pot cover 14 is operatively connected to the flower pot 16. Each overlapping fold 42 extends an arbitrary distance and most of the overlapping folds 42 extend at arbitrary angles over the base 26 which enhances the mechanical strength of the base 26 as compared to the mechanical strength which might be imparted to the base 26 by overlapping folds extending only in vertical or horizontal directions. Significantly, the overlapping folds 42 permit relatively thin sheets (films) of material to be utilized to form the decorative flower pot cover 14, in a manner and for reasons to be discussed further below.

As shown in FIG. 5, the sheet of material 12 has an upper surface 41 and a lower surface 43 and, in accordance with the present invention, either the upper surface 41 or the lower surface 43 or both of the sheet of material 12 is adapted to be bondable so that, when portions of the bondable surface are brought into bondable contact, such portions are bondably connected. The overlapping folds 42 are formed by overlapping portions of the bondable surface and bringing such overlapping portions into bondable engagement or contact. In this manner, the overlapping folds 42 are permanently fixed in the article.

When an overlapping fold 42 is formed with a portion of the sheet of material 12 during the forming of the decorative flower pot cover 14, portions of the upper surface 41 are overlapped and brought into bondable contact or engagement and, with respect to the same overlapping fold 42, portions of the lower surface 43 also are overlapped and brought into bondable contact or engagement. As mentioned before, at least one of the upper and the lower surfaces 41 and 43 is prepared to be bondable to form a bondable surface which is adapted to be bonded to portions of a similar bondable surface when bondably contacted with a similar bondable surface portion. Thus, in those instances where only the lower surface 43 is prepared to form a bondable lower surface 43, the overlapping portions of the bondable lower surface 43 are brought into bondable contact during the forming of the decorative flower pot cover 14 and such overlapping portions are bonded to form the overlapping folds 42, and, in this instance, the corresponding overlapping portions of the upper surface 41 are not bonded. In those instances where only the upper surface 41 is prepared to form a bondable upper surface 41, the overlapping portions of the bondable upper surface 41 are brought into bondable contact during the forming of the decorative flower pot cover 14 and such overlapping portions are bonded to form the overlapping folds 42 and, in this instance, the corresponding overlapping portions of the lower surface 43 are not bonded. In those instances where both the upper and the lower surfaces 41 and 43 are prepared to form bondable upper and lower surfaces 41 and 43, the overlapping portions of the upper and the lower surfaces 41 and 43 forming each overlapping fold 42 are brought into bondable contact during the forming of the decorative flower pot cover 14 and such overlapping portions of the upper and the lower surfaces 41 and 43 are bonded to form the overlapping folds 42.

It has been found to be necessary only to prepare one of the upper and the lower surfaces 41 or 43 to form a bondable surface so the decorative pot cover 14 is formable from the film sheet of material 12 having sufficient mechanical strength to retain its formed shape in accordance with the present invention. However, it should be noted that preparing both the upper and the lower surfaces 41 and 43 to form bondable surfaces provides additional mechanical strength which may be desired in some applications and particularly in those applications where the additional mechanical strength is needed to enable the formed article to maintain or retain its formed shape, such additional strength being needed either because of the particular shape of the article or the particular thickness or characteristics of the particular film forming the sheet of material 12.

Various techniques are utilized to prepare the sheet of material 12 with at least one bondable surface in accordance with the present invention.

One technique for preparing the bondable surfaces is to utilize polyvinyl chloride film to form the sheet of material 12 which is heat sealable. When utilizing a processed organic polymer heat sealable film, the upper and the lower surfaces 41 and 43 of the sheet of material 12 are bondable surfaces and the sheet of material 12 must be heated during the forming of the article or, more particularly, the forming of overlapping folds 42. Thus, in this instance, the term "bondable contact" or "bondable engagement" means contacting engagement and the application of the required amount of heat to effect heat sealable bonding of the contacting surfaces.

It should be noted that a light activated adhesive also is suitable for use in preparing the bondable surface in accordance with the present invention. In this instance, a heating element would not be necessary; however, means for lighting the areas to be bonded would be necessary which might be effected by substituting light sources for the heating element described herein and constructing the male and female dies of a light transparent material. In this instance, the term "bondable contact" or "bondable engagement" means contacting engagement and the applications of sufficient light to effect the bond.

One other technique for preparing the bondable surfaces is to utilize a non-heat sealable film to form the sheet of material 12 and to apply a heat sealable coating to either the upper surface 41 or the lower surface 43 or both. Heat sealable adhesives are commercially available. The term "bondable contact" or "bondable engagement" as used in this instance means contacting engagement and the application of the required amount of heat to effect heat sealable bonding of the contacting surfaces. The heat sealable coating also can be a heat sealable lacquer, a pressure sensitive adhesive which also requires heat to effect the bond, or a hot melt adhesive.

One other technique for preparing the bondable surfaces is to utilize a non-heat sealable film to form the sheet of material 12 and to apply a contact adhesive coating to either the upper surface 41 or the lower surface 43 or both. Contact adhesives are commercially available. The term "bondable contact" or "bondable engagement" in this instance means contacting engagement sufficient to effect the adhesive bond between the contacted surfaces.

It is sometimes desirable, for aesthetic purposes to control the number and direction of the overlapping folds. For example, the flower pot cover 14 shown in FIGS. 3 and 4 has flared petal-like portions 36 which are substantially smooth and substantially free of overlapping folds.

The cover forming system 10 is constructed and adapted substantially to accomplish this desired characteristic of the decorative flower pot cover 14 in a manner which will be described in greater detail below.

As shown in FIGS. 1 and 1A, the system 10 includes a male die 44 having an upper end 46 and a lower end 48. A male die surface 50 is formed on a portion of the outer peripheral surface of the male die 44 and the male die surface 50 extends a distance generally from the lower end 90 of a member such as ejector cone 88 toward the upper end 46 of the male die 44. A portion of the male die surface 50 extending from the lower end 90 a distance toward the upper end 46 of the male die 44 forms a base portion 52 of the male die surface 50, and the base portion 52 of the male die surface 50 has an outer peripheral surface which is shaped about the same as the outer peripheral surface 22 of the flower pot object 16, when the ejector cone 88 is in the storage position, that is when the ejector cone 88 is fully retracted in the direction 86 (FIG. 1). The dimensions of the base portion 52 are slightly larger than the comparable dimensions of the outer peripheral surface 22 of the flower pot 16, so the decorative flower pot cover 14 will fit generally about the outer peripheral surface 22 of the flower pot 16 when the decorative flower pot cover 14 is operatively connected to the flower pot 16. The base portion 52 has an upper end 54 and a lower end 56, the lower end 56 of the base portion 52 coinciding with and forming the lower end 48 of the male die 44. Thus, the base portion 52 of the male die surface 50 generally is frusto-conically shaped and includes the surface 57 on the ejector cone 88 when the ejector cone 88 is fully retracted in direction 86. The diameter of the base portion 52 generally at the lower end 56 is smaller than the diameter of the base portion 52 generally at the upper end 54 of the base portion 52. A portion of the male die surface 50 flares a distance angularly outwardly and upwardly from the upper end 54 of the base portion 52, the flared portion 58 of the male die surface 50 having an upper end 60 and a lower end 62 with the lower end 62 being connected to the upper end 54 of the base portion 52. As shown in FIG. 1A, the flared portion 58 extends at an angle 64 outwardly and upwardly from the upper end 54 of the base portion 52.

The lower end 48 of the base portion 52 of the male die 44 has an aperture 66 with an upper end 68 and a lower end 70 contiguous with the lower end 48 of the male die 44. An inner aperture surface 72 extends from the upper end 68 to the lower end 70 of the aperture 66.

The male die 44 has a passage 74 extending from the lower end 48 to the upper end 46. Rod 76 having one end 78 reciprocatingly disposed in a pneumatic cylinder 80 is slidingly secured within the passage 74. It should be noted that pneumatic cylinders are preferred, however, hydraulic cylinders may also be used. The pneumatic cylinder 80 is secured to the upper end 46 of the male die 44 via bridge plate 81 and standoffs 83 (only one standoff 83 being labeled on FIGS. 1 and 1A). The pneumatic cylinder 80 is adapted and positioned to move the second end 82 of the rod 76 in a downward direction 84 to an unloading position (shown in FIG. 1)

and to move the second end 82 of the rod 76 in an upward direction 86 to a storage position.

As shown in FIG. 1A, an ejector cone or plate 88 is secured to the end 82 of the rod 76. The cone 88 has a lower end 90 and an upper end 92. A cone surface 94 is formed on the outer peripheral surface of the cone 88 and the cone surface 94 has an upper portion 95 and a lower portion 97. The upper portion 95 extends from the upper end 92 to a lower end 93 and is shaped about the same as the inner aperture surface 72 of the male die 44, the dimensions of the aperture 66 being slightly larger than the comparable dimensions of the upper portion 95 of the cone surface 94 so the cone 88 will fit generally in the aperture 66. The lower portion 97 of the cone 88 extends from the lower end 93 of the upper portion 95 of the cone surface 94 to the lower end 90 of the ejector cone 88. The lower portion of the cone 88 has an outer peripheral surface 57 sized and shaped to align with the male die 44 such that the outer peripheral surface 99 of the cone 88 forms the lower end 56 of the male die surface 50.

As shown in FIG. 1, a rod 96 is reciprocatingly disposed in a pneumatic cylinder 98 and the rod 96 of the pneumatic cylinder 98 is connected to the bridge plate 81. The pneumatic cylinder 98 is adapted and positioned to move the male die 44 in a downward direction 100 to a forming position and to move the male die 44 in an upward direction 102 to a storage position (shown in FIG. 1). The pneumatic cylinder 98 is connected to a frame 104, and the pneumatic cylinder 98 and the frame 104 cooperate to support the male die 44 a distance above a support surface 106.

At least one and preferably a plurality of openings 108 (only one opening 108 being designated by a reference numeral in FIG. 1A) extend through the male die 44, each opening 108 extending through the die surface 50 of the male die 44. One end of a conduit 109 is connected to the male die 44 and is positioned in communication with the openings 108. A vacuum source 112 is connected to the conduit 110.

An air supply 118 is connected to the pneumatic cylinder 8 and a control valve 120 is interposed between the air supply 118 and the pneumatic cylinder 80. In one position of the control valve 120, the air supply 118 is connected to the upper end of the pneumatic cylinder 80 for moving the cone 88 in the downward direction 84 and, in one other position of the control valve 120, the air supply 118 is connected to the lower end of the pneumatic cylinder 80 for moving the cone 88 in the upward direction 86.

A sensor (not shown) such as a magnetic reed switch, inputs data to a control box 125. This sensor senses the rod 76 and indicates when the rod 76 is in the stored position. The sensor also senses when the rod 76 extends. The sensor relays this information to the control box 125 where the information is used to start a timing sequence which calculates when the cone 88 has reached the end of the eject stroke, that is, when rod 76 is extended in direction 84 Once the cone 88 has reached the end of the eject stroke, the box 125 produces a signal causing the valve 120 to be switched such that the cone 88 is retracted in direction 86 to the storage position.

The air supply 118 is also connected to the pneumatic cylinder 98 and a control valve 122 is interposed between the air supply 118 and the pneumatic cylinder 98. In one position of the control valve 122, the air supply 118 is connected to the upper end of the pneumatic cylinder 98 for moving the male die 44 in the downward direction 100 and, in one other position of the control valve 122, the air supply 118 is connected to the lower end of the pneumatic cylinder 98 for moving the male die 44 in the upward direction 102.

Control valve 123 is used to decelerate the movement of the male die 44 in the upward direction 102 over the last few inches of travel. Control valve 123 is interposed between valve 122 and the cylinder 98. Sensor 127, preferably a reed switch secured to the cylinder 98, sends a signal to the control box 125 when the male die 44 approaches the end of the stroke in direction 102. In response to this signal, the control box 125 causes switch 123 to close thereby diverting air through a restricted orfice 129 and thus decelerating the movement of the male die 44 in direction 102.

A heating element 124 is secured to the upper portion of the male die to the upper end 60 of the flared portion 58 of the male die 44. The heating element 124 is secured such that heat from the heating element 124 is transferred to the male die surface 50 to heat the male die surface 50 to a predetermined temperature level during the operation of the system 10. The heating element 124 is connected to an electrical control box 125. In one form, the control box 125 also includes a switch (not shown) for conditioning the heating element 124 in the heating mode or, in other words, for applying electrical power to the heating element 124 in the closed position of such switch and the control box 125 also may be connected to a temperature sensing device (not shown) located on the heating element 124 and positioned to sense the temperature level of the male die surface 50, the sensing device controlling the connection of the electrical power supply to the heating element 124 to maintain the temperature level of the male die surface 50 at a desired predetermined temperature level.

As shown in FIGS. 1 and 1B, the system 10 also includes a female die 126 having an upper end 128 and a lower end 130. An opening is formed through the upper end 128 of the female die 126 extending a distance generally toward the lower end 130 of the female die 126, the opening forming a female die surface 132 having an upper end 134 and a lower end 136. The post 168 supports the male die 44 a distance generally above and generally aligned with the female die 126 in the storage position. The opening forming the female die surface 132 is shaped and sized to receive and formingly mate with the male die surface 50 with a sufficient clearance therebetween to accommodate portions of the sheet of material 12 (FIGS. 3 and 4) during the forming of the decorative flower pot cover 14.

The female die surface 132 includes a base portion 138 having an upper end 140 and a lower end 142. The base portion 138 is generally frusto-conically shaped and, thus, the diameter of the base portion 138 generally near the lower end 142 is smaller than the diameter of the base portion 138 generally near the upper end 140 of the base portion 138. The base portion 138 of the female die 126 is shaped to mate with the base portion 52 of the male die 44 with sufficient clearance therebetween to accommodate portions of the sheet of material 12 during the forming of the decorative cover 14.

The female die surface 132 also includes a flared portion 144 having an upper end 146 and a lower end 148, the lower end 148 of the flared portion 144 being connected to the upper end 140 of the base portion 13B. The flared portion 144 extends angularly outwardly and upwardly from the upper end 140 of the base portion 138. The flared portion of the female die surface 132 is shaped to mate with the flared portion 58 of the male die 44 with sufficient clearance therebetween to accommodate portions of the sheet of material 12 during the forming of the decorative cover 14. The flared portion 144 extends at an angle 150 which is about the same as the angle 64.

Heating element 152 is connected to the female die 126. The heating element 152 is positioned below the female die 126 and connected to the electrical power supply in control box 125 for heating the female die surface 132 to a predetermined temperature level during the forming of the decorative cover 14 and a temperature sensing device (not shown) may be connected to the female die 126 in a manner and for reasons like that described before with respect to the heating element 124 in the male die 44.

As shown in FIGS. 1 and 2, the system 10 includes a support surface 156 having an opening 158 formed therein. The female die 126 is disposed through the opening 158 to a position wherein the upper end 128 of the female die 126 is disposed generally adjacent the support surface 156.

Four circumferentially spaced support surfaces 160 are secured to the support surface 156 with each support surface 160 being disposed in a generally horizontal plane.

Each support surface 160 is generally triangularly shaped with the base of each triangularly shaped support surface 160 being disposed near the opening in the female die 126 and with each triangularly shaped support surface 160 extending and terminating with the triangle apex outermost end. The support surfaces 160 are spaced apart at about ninety degree intervals circumferentially about the opening in the female die 126, and the support surfaces 160 are arranged about the female die 126 so the edges of such support surfaces 160 cooperate to form a substantially square shape in a plan view as shown in FIG. 1B with the outermost ends of the support surfaces 160 forming the corners of this square shape.

Each support surface 160 is connected to and spaced above the support surface 156. A plurality of hold openings 162 are formed through each support surface 160 (only one of the hold openings 162 being designated by reference numerals in FIG. 1B) and the hold openings 162 in each support surface 160 are in communication with a vacuum source 164.

The support surfaces 160 and the female die 126 are supported by the frame 104 via platform 163 and adjustable mounting brackets 165.

A vacuum source 164 is connected to the support surfaces 160 and a control valve 166 is interposed between the support surfaces 160 and the vacuum source 164, the vacuum source 164 being in communication with the hold openings 162 in the support surfaces 160 in the opened position of the control valve 166. In one (opened) position of the control valve 166, communication is established between the hold openings 162 and the vacuum source 164 and, in one other (closed) position of the control valve 166, communication is interrupted between the hold openings 162 and the vacuum source 164.

The frame 104 has a post 168 secured to and extending from the platform 163. The post 168 extends up from the platform 163 a distance and ends with an upper end 170. A beam 172 comprising the pneumatic cylinder 98, the rod 96 and the pneumatic cylinder 80 is pivotally attached near the upper end 170 of the post 168 by an axle 174 (shown on FIG. 2). The axle 174 is rotatably secured within a housing 176 such that a first end 178 of the axle 174 extends from the housing 176 and is secured to the beam 172. The second end 180 of the axle 174 passes through an opening in the upper end 170 of the post 168. The first end 184 of an arm 182 is secured to the second end 180 of the axle 174 and extends generally horizontally a distance from the axle 174 to a second end 186 of the arm 182. A rod 188 is reciprocatingly disposed in a pneumatic cylinder 190 and the rod 188 of the pneumatic cylinder 190 is connected to the second end 186 of the arm 182. The pneumatic cylinder 190 is connected to post 168 and is adapted and positioned to move the beam 172 in direction 192 to an unloading position (shown in FIG. 1) and to move the beam 172 in direction 194 to a forming position.

The air supply 118 is connected to the pneumatic cylinder 190 and a control valve 196 is interposed between the air supply 118 and the pneumatic cylinder 190. In one position of the control valve 196 the air supply 118 is connected to the upper end of the pneumatic cylinder 190 for moving the second end 186 of the arm 182 in a downward direction thereby causing the beam 172 to swing in direction 192 to an unloading position. In one other position of the control valve 196 the air supply 118 is connected to the lower end of the pneumatic cylinder 190 for moving the beam 172 in direction 194.

Figure 6:
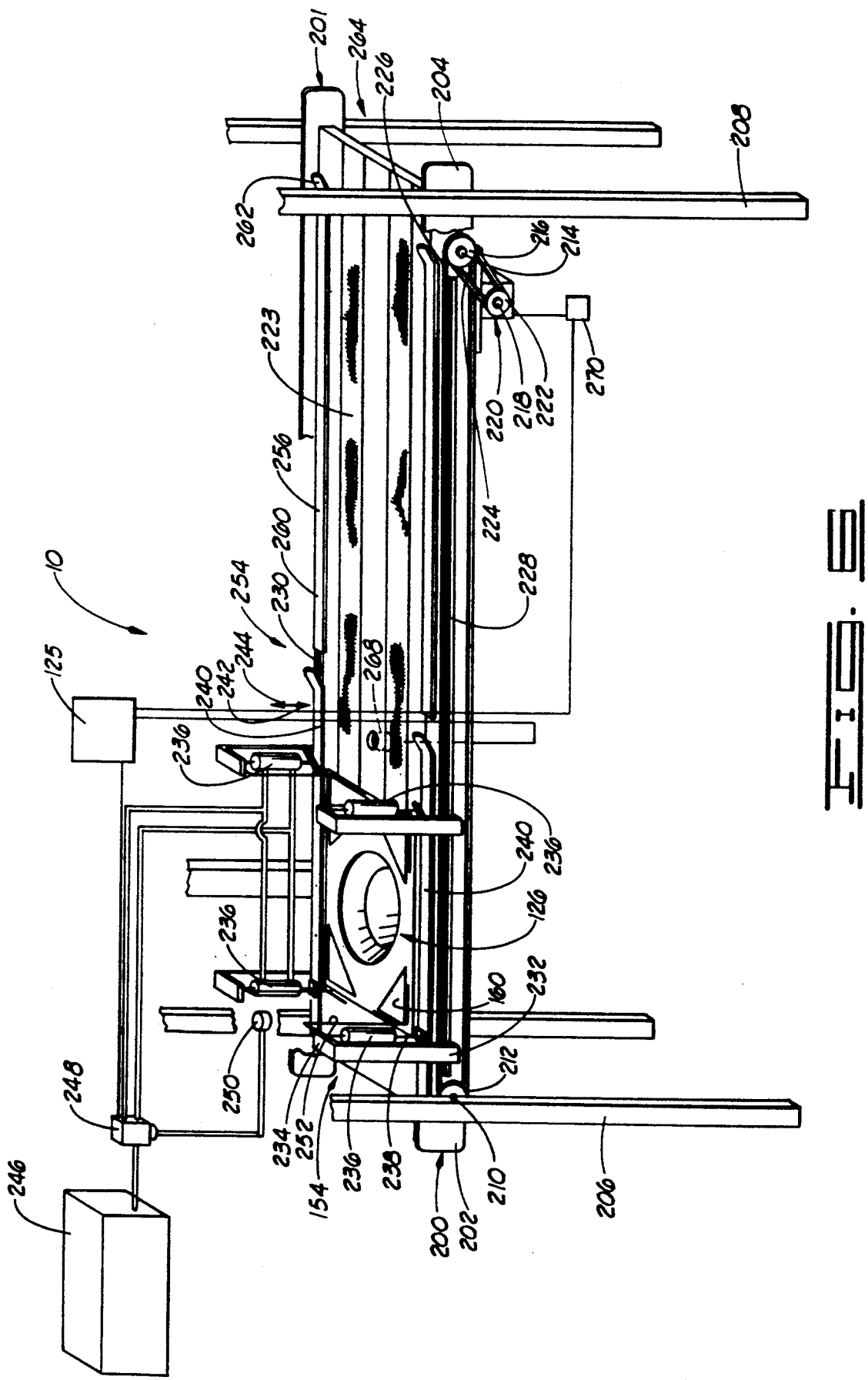
FIG. 6 is a schematic perspective view of part of the article forming system of FIGS. 1 and 2 with parts removed for clarity.

Referring now to FIG. 6, rails 200 and 201 are movably secured to the frame 104. Each rail 200 and 201 has a first end 202 and a second end 204. Each first end is movably secured to a frame leg 206 and each second end 204 being movably secured to a frame leg 208. A first axle 210 is rotatably secured generally near the first end 202 of the first rail 200, and extends to the second rail 201 and is rotatably secured near the first end 202 of the second rail 201. Idler pulleys 212 are slidingly secured toward each end of the first axle 210 (only one idler pulley 212 being designated in FIG. 6). A second axle 214 is secured to the second end of the rails 200 and 201 in a manner similar to that just described for the first axle 210. Drive pulleys 216 are slidingly secured toward each end of the second axle 214 such that when one drive pulley is rotated, the other drive pulley rotates. A main drive pulley (not shown) is secured to axle 214 such that when the main drive pulley is rotated, drive pulleys 216 also rotate. A motor 220 is secured to rail 200 generally near the second end 204. The motor 220 has a rotatable drive shaft 218 with a motor drive pulley 222 secured to one end of the drive shaft. A drive belt 224 extends around the motor drive pulley 222 and the drive pulley 216.

A material moving belt 22 extends from around drive pulley 216 to and around idler pulley 212. The pulleys 212 and 216 are located such that the upper surface of the belt 226 is slightly above the support surface 160. It has been found that a material moving belt 226 and 230 made of urethane is preferred to hold and move a sheet of material 12. However, other types of materials may be used to form the belts 226 and 230.

The rails 200 and 201 support the ends of crossrods such as crossrods 209 and 211 (FIG. 2). At least two rods support belt supports 228 (only one belt support 228 being shown on FIG. 6). The belt supports 228 are adjustable by sliding on these rods, that is, the belt supports slide on the rods so that they may be positioned closer together or further apart. In this way, the material moving belts 226 and 230 and the belt supports 228 may accommodate different sheet sizes.

A set of support brackets 232 are secured to the belt supports 228 generally near the first end 202 of the rails 200 and 201 (only one of which is described herein). The support brackets 232 extend up above and out over the platform 254 to bracket ends 234. Pneumatic cylinders 236 and 237 are secured to the bracket end 234 and rods 238 are reciprocatingly disposed in pneumatic cylinders 236 and 237. The rods 238 of the pneumatic cylinders 236 and 237 are connected to the upper side of a material holddown rails 240. The pneumatic cylinders 236 and 237 are adapted and positioned to allow the holddown rails 240 to lower in a downward direction 242 to a material moving position and to raise the material holddown rails 240 in an upward direction 244 to a material release position. The air cylinder rods 238 are loosely connected to the top sides of the holddown rails 240, as described in detail below, such that in the down position the rails 240 are not pushed down, but the weight of the rails 240 is allowed to be exerted on the material, pressing it down on the material moving belts 226 and 230.

An air supply 246 is connected to the pneumatic cylinders 236 and 237 and a control valve 248 is interposed between the air supply 246 and the pneumatic cylinders 236 and 237. In one position of the control valve 248, the air supply 246 is connected to the upper end of the pneumatic cylinders 236 and 237 for allowing the holddown rails 240 to lower in the downward direction 242 and, in one other position of the control valve 248 the air supply 246 is connected to the lower end of the pneumatic cylinders 236 and 237 for raising the holddown rails 240 in the upward direction 244.

A sensor 250 is secured to a support bracket 232 and connected to the control box 125 which controls valve 248. In this way, the control valve 248 raises the holddown rail 240 when a sheet of material 12 is located over the female die 126.

Figure 11:
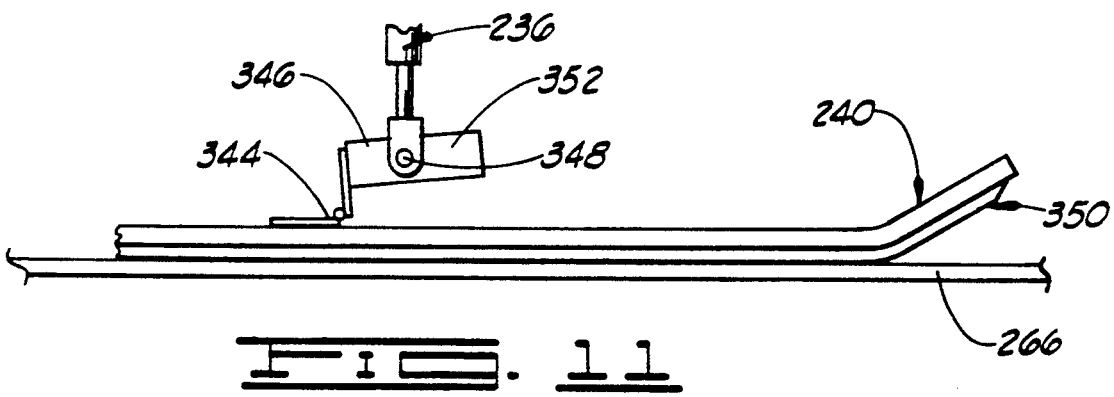
FIG. 11 is an enlarged schematic elevational view of a portion of the article forming system of FIG. I.

The end of material holddown rails 240 are secured to cylinders 236 by a double-hinge arrangement. With reference to FIG. 11, hinge 344 is secured to rail 240 and to block 346. The block 346 is rotatably secured to the pin 348 on cylinder 236. In this way the cylinder 236 does not push the rail 240 down, but lowers it to a point where the weight of the rail 240 itself is the only force exerted downwardly on a sheet of material 12.

The block 346 may be modified to adjust the amount of weight exerted downward. For example, block end 352 may be extended to counterbalance the weight of the rail 240, thereby reducing the amount of downward force exerted by the rail 240.

A material guide 252, shown in FIG. 6, may be secured to the the bracket end 234. The material guide 252 causes the sheet of material 12 to fold at a predetermined location when the male die 44 is moving from the storage position to the forming position. The shape and location of the material guide 252 is changed according to the desired final shape of the flower pot article. The material guide 252 has an L shaped base with the corner of the L being located generally above the outer corner of the perforated portion of the support surface 160. Generally a material guide is secured to each bracket 232 thereby guiding all sides of the sheet of material 12. However, in some instances it may be preferred to use fewer or more material guides depending on the desired shape of the flower pot article 14.

A second set of holddown rails 256 having a first end 260 and a second end 262 extend from the first set of holddown rails 240 along the length of the platform 254 above the belts 226 and 230 generally to the end 204 of the support rails 200 and 201 to a loading position 264. The holddown rails 256 are movably secured to the support rails 200 and 201 by mounts 266 (FIG. 6). The mounts 266 are adapted to automatically adjust the force exerted by the rails 256 against the belts 226.

Figure 12:
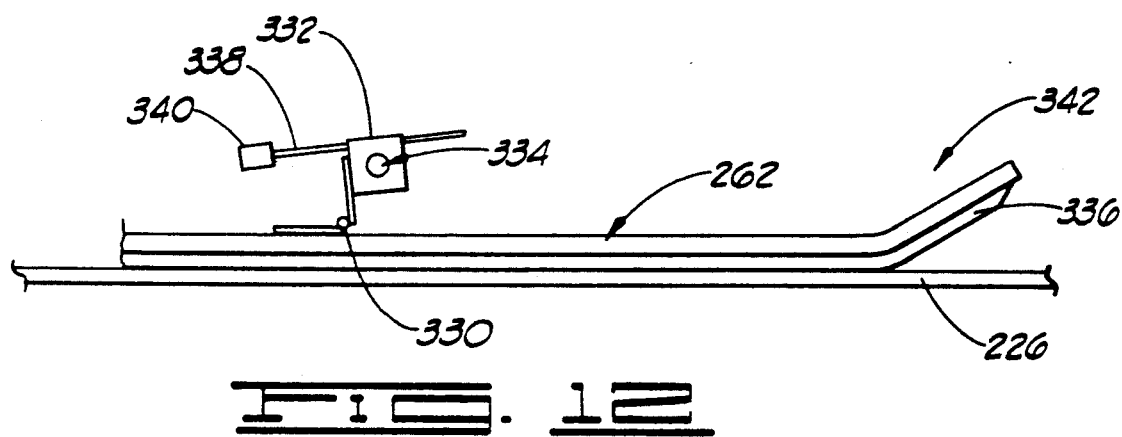
FIG. 12 is an enlarged schematic elevational view of another portion of the article forming system of FIG. 1.

The end 262 of the material holddown rails 256 are secured to rails 201 and 204 by double-hinge mounts 266 which tends to swing the holddown rails 256 upward if the friction from the sheet of material 14 or the belts 226 and 230 increases. In this way, changes in the thickness of the sheet of material 14 and frictional forces are automatically compensated for by the swinging action. Referring to FIG. 12, the double-hinge arrangement has a hinge 330 secured to rail 256 and to block 332. The block 332 is rotatably secured to a rod 334 which extends from rail 201 to rail 203 (FIG. 2). Lever 338 and weight 340 may be added to adjust the amount of downward force exerted by the rail 256.

Referring again to FIG. 6, a second sensor 268 is secured to the platform 154 near the first end 260 of the rails 256 and connected to the control box 125. The control box 125 is also connected to a sensor on pneumatic cylinder 190 (FIG. 1) and to sensor 250 (FIG. 2). In this way, the switch 270 may be adapted to interrupt the flow of current to the motor 222 when a sheet of material 12 is near the end of the rails 256 and the support surface 160 is not clear to accept the sheet of material 12. More particularly, if sensor 250 emits a signal that a sheet of material is on support surface 160 and another sheet is detected by the sensor 268, the switch 270 interrupts current to the motor 222 and the switch 270 reestablishes current to the motor 222 once the support surface 160 is clear which may be indicated by sensing the movement of the rod 188.

Preferably, strips of drag reducing material 223 are secured to the platform 254 and extend from the loading position 264 to generally near the female die 126. The drag reducing material 223 preferably reduces the amount of material 1 touching the platform 254 at any one time. For example, if wire mesh is used as the friction reducing material 223 the square inches of the sheet of material 12 which are in contact with the platform 254 at any one time is significantly reduced. In addition, the drag reducing material 223 may be made of a material such as copper and thereby not only reduce friction, but also dissipate static electricity which may have accumulated in the sheet of material 12. Also, several strands of wire or string-like material stretched above platform 254 (or in place of platform 254) would be for suitable reducing drag.

Referring now to FIGS. 7 and 8, an article receiving chute 272 accepts formed articles as they are unloaded from the male die 44. Legs 274 secured to the chute extend from the chute to a support surface 106 and are adapted to support the chute 272 in a position to receive formed articles from the male die 44. The chute 272 has a bottom 276, a first side 278 and a second side 280. The first and second sides 278 and 280 are substantially similar in construction and therefore only one side 278 will be described in detail.

Side 278 has a first end 282, a second end 284, a top edge 286 and a bottom edge 288. The top and bottom edges 286 and 288 may be generally curvilinear in shape and extend generally parallel to each other from the first end 282 to the second end 284 of the chute 272. The bottom 276 at end 288 is generally parallel to the line of travel of the ejector cone 88 when the male die 44 is in the unloading position (FIG. 1) and the second end 284 of the side 278 may be generally perpendicular to the surface 106. The bottom 276 of the chute 272 is secured to the bottom side 288 of each chute side 278 and 280 thereby joining the first and second sides 278 and 280 and forming a U shaped chute. The chute also has inner sides 279 and 281 which are adjustably secured to sides 278 and 280 respectively by adjusting screws 283. In this way, inner sides 279 and 281 may be adjusted to accept different sizes of formed articles.

A pneumatic cylinder 290 is secured to the bottom 276 (generally near the first end 282) of the chute 272. A rod 292 reciprocatingly disposed in a pneumatic cylinder 290 has a plurality of teeth 294 secured thereto. The pneumatic cylinder 290 is adapted and positioned to move the teeth 294 in direction 296 to move a stack of formed articles 302 and to move the teeth 294 in direction 298 to a ready position. The teeth 294 extend through an opening 300 in the bottom side 288 of the chute 272 and releasably engage one or more formed articles 302 in the chute 272. Air from pneumatic cylinder 80 (FIG. 1), or any other cylinder, is directed through conduit 306 to operate pneumatic cylinder 290.

In operation, the sheet of material 12 is placed on the platform 254 at the loading position 264 with the outer portions of the sheet of material 12 being disposed generally over material moving belts 226. The sheet of material 12 is then pushed under holddown rails 256, and the material moving belts 226 move the sheet of material 12 over the support surface 160 with the central portion of the sheet of material 12 being disposed generally over the opening in the female die 126. The sensor 250 senses the presence of the sheet of material 12 as it is positioned over the opening in the female die 126 and sends a signal to control valves 248 and 166 thereby raising the holddown rails 240 and applying vacuum from the vacuum source 164 to the sheet of material 12 through the hold openings 162 (FIG. 1B), thus holding the sheet of material over the female die 126.

As mentioned before, the sheet of material 12 preferably is square-shaped and, in this instance, each corner of the square-shaped sheet of material 12 is held near the apex of one of the support surfaces 160, each portion of the sheet of material 12 disposed adjacent the corner being disposed generally over the support surfaces 160. In this position, the sheet of material 12 is disposed on the support surface 160 generally between the male die 44 and the female die 126.

Initially, the pneumatic cylinder 98 supports the male die 44 in the storage position disposed a distance above and generally over the female die 126. The control valve 116 is positioned to connect the openings 108 in the male die 44 to the vacuum source 112 no later than the bottom of the forming stroke. The heating element 124 on the male die 44 and the heating element 152 under the female die 126 each are connected to the electrical power supply so the heating element 124 cooperates to heat the male die surface 50 to the predetermined temperature level and the heating element 152 under the female die 126 cooperates to heat the female die surface 132 to the predetermined temperature level.

Since the hold openings 162 in the support surfaces 160 are in communication with the vacuum source 164, the portions of the sheet of material 12 generally near each of the corners of the object of material 12 are biased or pulled generally toward the respective support surfaces 160 when the sheet of material 12 initially is placed or positioned on the support surface 160. The amount of vacuum applied through the hold openings 162 is relatively slight so the vacuum tends to bias or pull the portions of the sheet of material 12 generally near the corners toward the respective support surfaces 160, yet the vacuum is small enough to permit the corner portions of the sheet of material 12 to be pulled across the respective support surfaces 160 toward the opening in the female die 126 during the forming of the decorative flower pot cover 14.

After the sheet of material has been positioned on the support surface 160 in the manner described before, the control valve 122 is positioned to connect the upper end of the pneumatic cylinder 9B to the air supply 118 for moving the male die 44 in the downward direction 100 toward the female die 126. As the male die 44 moves in the downward direction 100, the male die 44 moves to a position wherein the lower end 90 of the ejector cone 88 initially engage the portion of the sheet of material 12 disposed over the opening in the female die 94.

The pneumatic cylinder 98 continues to move the male die 44 in the downward direction 100 pushing portions of the sheet of material 12 generally into the opening in the female die 126 forming the female die surface 132. Until the male die 44 is in a position wherein the male die surface 50 is matingly disposed within the female die surface 132 with the lower end 56 of the male die 44 being disposed generally near the lower end 136 of the female die surface 132, portions of the sheet of material 12 being disposed generally about the male die surface 50 and generally between the male die surface 50 and the female die surface 132 in the forming position of the male die 44 within the female die surface 132.

The vacuum applied through the hold openings 162 in the support surfaces 160, permits the portions of the sheet of material 12 disposed generally over the support surfaces 160 to be biased toward such support surfaces 160 and yet to be slidingly moved in the direction generally toward the opening in the female die 126 as the male die 44 engages the sheet of material 12 and pushes the sheet of material 12 into the opening forming the female die surface 132 as the male die 44 is moved to the forming position. In the forming position of the male die 44, the vacuum applied through the hold openings 162 in the support surfaces 160 cooperate to hold the four corner portions of the sheet of material 12 generally against the respective support surfaces 160 during the forming of the decorative cover 14.

In the forming position of the male die 44 within the opening forming the female die surface 132, the base portion 138 of the female die 126 cooperates with the base portion 52 of the male die 44 to form the portion of the sheet of material disposed therebetween into the base 26 of the decorative flower pot cover 14. The flared portion 144 of the female die 126 cooperates with the flared portion 58 of the male die 44 to form the portion of the sheet of material 12 disposed therebetween into the lower portion of the decorative border 34 generally adjacent the upper end 28 of the base 26, thereby establishing or forming the angle at which the decorative border 34 extends upwardly and outwardly from the opened upper end 28 of the base 26. The four flared petal-like portions 36 of the decorative border 34 are disposed on the respective support surfaces 160 during the forming of the decorative cover 14. The vacuum applied at the hold openings 162 biases the four corner portions of the sheet of material 12 against the respective support surfaces 160 which tends to pull or hold the four corner portions from being pushed into the opening in the female die 126, although the vacuum is slight which permits the four corner portions of the sheet of material 12 to slide over the support surfaces 160 toward the opening in the female die 126 during the forming process. This action on the four corner portions of the sheet of material 12 tends to keep overlapping portions or overlapping folds from forming in the petal-like portions 36 of the formed decorative flower pot cover 14.

In a preferred form, the control valve 122 includes a timer which is constructed and adapted to keep the air supply 118 connected to the pneumatic cylinder 98 for holding the male die 44 in the forming position with respect to the female die 126 for a predetermined period of time which, in one embodiment, is about three seconds, for example, the particular time being sufficient to form the decorative flower pot cover 14 and to permit the bonding of the overlapping folds 42. At the end of this predetermined period of time, the control valve 122 is moved to connect the air supply 118 to the lower end of the pneumatic cylinder 98, thereby causing the male die 44 to be moved in the upward direction 102 to the storage position. As the male die 44 is moved in the upward direction 102 to the storage position, the vacuum applied through the openings 108 in the male die 44 holds the formed cover against the male die surface 50.

After the male die 44 has reached the storage position, control valve 196 is positioned to connect the upper end of the pneumatic cylinder 190 to the air supply 118 for moving the beam 172 to the unloading position wherein the male die 44 is generally aligned with the first end 282 of the article receiving chute 272. At generally the same time, control valve 120 is positioned to connect the upper end of the pneumatic cylinder 80 to the air supply 118 for moving the ejector cone 88 to the unloading position (shown in FIG. 1) and vacuum is released from opening 108. The ejector cone extends at a sufficient rate to carry the formed article flower pot cover to the article receiving chute 272. Either before, during or after, but most preferably during, the extension of the ejector cone, air is directed through conduit 306 (FIG. 7) to pneumatic cylinder 290. In this way, the teeth 294 are first pushed toward the second end of the article receiving chute thereby moving formed articles 302 a distance toward the second end of the chute, and then the teeth are repositioned and ready for the next cycle when the formed articles will be moved again.

After the ejector cone 88 has reached the unloading position, control valve 120 is positioned to connect the lower end of the pneumatic cylinder 80 with the air supply thereby causing the ejector cone 88 to move in direction 86 back to the forming position and later, control valve 122 is positioned to connect the air supply 118 to the lower end of the pneumatic cylinder 190 thereby moving the beam 172 in direction 194 back to the storage position.

It should be noted that the vacuum source 164 actually is a blower which may be connected in such a manner as to impose a vacuum through the hold openings 162. Also, it should be noted that, in one embodiment, the system 10 does not include the blower 114 and, in this embodiment, the valve 116 is positioned to disconnect the vacuum source 112 from the openings 108 in the male die 44 when the male die 44 is moved to the unloading position. In this embodiment, the formed decorative flower pot cover 14 is released from the male die 44 by the ejector cone 88, the formed decorative flower pot cover 14 simply being pushed off the male die 44.

It should be noted that, in some applications, the flower pot cover 14 may be formed without using the vacuum source 112 applied at the openings 108 in the male die 44. However, it has been found that without vacuum being applied at openings 108, the formed decorative flower pot cover may fall from the male die 44 before the ejector cone extends, thus allowing the formed decorative flower pot cover to escape being placed in the article receiving chute.

As soon as a first sheet of material has left the loading position 264, a second sheet may be placed on the platform 254 at the loading position 264. The second sheet will travel toward the male die 44, but if the first sheet has not cleared the female die 126, switch 270 will be opened thereby stopping the material moving belts 226 and 230 and thus holding the second sheet of material short of the female die 126. In this way, several sheets of material may be on the platform 254 at the same time so that each will move up as the apparatus completes a cycle. Once the male die 44 has retracted from the forming position, the material moving belts 228 and 230 may be restarted.

The Embodiments of FIGS. 9 and 10

Shown in FIG. 9 is a modified platform 254A which is constructed exactly like the platform 254 in FIGS. 1 and 2 and described in detail above, except the modified platform 254A includes modified holddown rails 240A and 256A (only rail 240A being shown in FIG. 9). The holddown rails 240A and 256A may have a plurality of perforations running the length of the rails 240A and 256A. The perforations may be connected to an air supply 312. In this way, the force of air passing through the perforations may hold the material against the material moving belts 226. The perforations may direct air directly against the moving belts 226 as represented by arrows 310 or the perforations may be inclined to direct the stream of air at least partially towards the female die 126 as represented by arrows 316. With this embodiment, the holddown rails 240 need not be connected to the pneumatic cylinders 236 and 237 and may be movably secured to the frame 104 such that the rails 240 float on a cushion of air, or the rails 240 may be rigidly secured a distance above the material moving belts 226. Similarly, the holddown rails 256 may be rigidly secured a distance above the material moving belts 226 or may be movably secured such that the rails float on a cushion of air.

Shown in FIG. 10 is another modified platform 254B which is constructed exactly like the platform 154 in FIGS. 1 and 2 and described in detail above except that the modified platform 254B of FIG. 10 has holding belts 320 and 322 instead of holddown rails 240 and 256 respectively.

The first end of the holding belts 320 extend around idler pulleys 324 (only one idler pulley 324 being labeled in FIG. 10). The idler pulleys 324 are each rotatably mounted to a bracket 326 on the end of cylinders 236. The pneumatic cylinders 236 and 237 are positioned and adapted to raise and lower the idler pulleys 324.

When the idler pulleys 324 are lowered, the holding belts 320 engage the material moving belt 326 such that the holding belts 320 is rotated around idler pulleys 324 and is synchronized with the material moving belt 326. When the idler pulleys 324 are raised, the holding belts 320 are disengaged with the material moving belts.

The second set of holding belts 322 extend around idler pulleys 328. The idler pulleys 328 are secured to the frame 104 such that the holding belts 322 engage the material moving belt 226 causing the holding belt 322 to rotate about the idler pulleys 328. In this way, the second set of holding belts 322 are synchronized with the material moving belt 226.

The embodiments 10A and 10B operate exactly in the same way as the embodiment of FIGS. 1 and 2 except in the way the sheet of material 12 is held against the material moving belt 226.

Changes may be made in the various elements, components, parts and assemblies described herein or in the steps or sequence of steps in the methods described herein without departing from the spirit and scope of the invention as defined in the following claims.

What is claimed is:

1. An apparatus for forming a sheet of material into an article, the apparatus comprising:
    a frame having a support surface with opposite sides for supporting a sheet of material;
    a male die secured to said frame;
    a female die secured to said frame and having an upper end, a lower end, and an opening extending from the upper end toward the lower end thereof, the opening being shaped to receive a portion of said male die in a forming position;
    means for moving the sheet of material from a loading position wherein the sheet of material is positioned to the side of said support surface, to a loaded position wherein the sheet of material is disposed upon said support surface over the opening of said female die and between said male die and said female die;
    a sensor secured to said frame for producing a signal when the sheet of material is in the loaded position; and
    means for moving at least one of said male die and said female die from a storage position wherein said male die is spaced a distance from the upper end of said female die, to the forming position wherein said male die is at least partially disposed in the opening of said female die, and from the forming position to the storage position, said die moving means moving at least one of said male die and said female die to the forming position in response to the signal from said sensor;
    wherein said sheet moving means comprises:
        a first continuous belt secured to said frame and extending from adjacent one side of said support surface to the loading position;
        a second continuous belt secured to said frame and extending from adjacent the opposite side of said support surface to the loading position;
        means for releasably holding at least one sheet of material against said first and second continuous belts; and
        means for rotating said belts so that a sheet of material may be moved from the loading position to the loaded position; and
    wherein said holding means comprises:
        one or more first rails secured to said frame generally parallel to said first continuous belt and extending substantially the length of said first continuous belt;
        one or more second rails secured to said frame generally parallel to said second continuous belt and extending substantially the length of said second continuous belt; and
        means for moving said first rails against and away from said first belt and for moving said second rails against and away from said second belt.

2. An apparatus for forming a sheet of material into an article, the apparatus comprising:
    a frame having a support surface with opposite sides for supporting a sheet of material;
    a male die secured to said frame;
    a female die secured to said frame and having an upper end, a lower end, and an opening extending from the upper end toward the lower end thereof, the opening being shaped to receive a portion of said male die in a forming position;
    means for moving the sheet of material from a loading position wherein the sheet of material is positioned to the side of said support surface, to a loaded position wherein the sheet of material is disposed upon said support surface over the opening of said female die;
    a sensor secured to said frame for producing a signal when the sheet of material is in the loaded position; and
    means for moving at least one of said male die and said female die from a storage position wherein said male die is spaced a distance from the upper end of said female die, to the forming position wherein said male die is at least partially disposed in the opening of said female die, and from the forming position to the storage position, said die moving means moving at least one of said male die and said female die to the forming position in response to the signal from said sensor;
    wherein said sheet moving means comprises:
        a first continuous belt secured to said frame and extending from adjacent one side of said support surface to the loading position;
        a second continuous belt secured to said frame and extending from adjacent the opposite side of said support surface to the loading position;
        means for releasably holding at least one sheet of material against said first and second continuous belts; and
        means for rotating said belts so that a sheet of material may be moved from the loading position to the loaded position; and
    wherein said holding means comprises:
        one or more first continuous holding belts secured to said frame generally parallel to said first belt and extending substantially the length of said first belt;
        one or more second continuous holding belts secured to said frame generally parallel to said second belt and extending substantially the length of said second belt; and
        means for moving said first continuous holding belt against and away from said first belt and for moving said second continuous holding belt against and away from said second belts.

3. An apparatus for forming a sheet of material into an article, the apparatus comprising:

a frame having a support surface with opposite sides for supporting a sheet of material;

a male die secured to said frame;

a female die secured to said frame and having an upper end, a lower end, and an opening extending from the upper end toward the lower end thereof, the opening being shaped to receive a portion of said male die in a forming position;

means for moving the sheet of material from a loading position wherein the sheet of material is positioned to the side of said support surface, to a loaded position wherein the sheet of material is disposed upon said support surface over the opening of said female die;

a sensor secured to said frame for producing a signal when the sheet of material is in the loaded position; and means for moving at least one of said male die and said female die from a storage position wherein said male die is spaced a distance from the upper end of said female die, to the forming position wherein said male die is at least partially disposed in the opening of said female die, and from the forming position to the storage position, said die moving means moving at least one of said male die and said female die to the forming position in response to the signal from said sensor;

wherein said sheet moving means comprises:
 a first continuous belt secured to said frame and extending from adjacent one side of said support surface to the loading position;
 a second continuous belt secured to said frame and extending from adjacent the opposite side of said support surface to the loading position;
 means for releasably holding at least one sheet of material against said first and second continuous belts; and
 means for rotating said belts so that a sheet of material may be moved from the loading position to the loaded position; and wherein said holding means comprises:
 one or more first rails secured to said frame generally parallel to said first continuous belt and extending substantially the length of said first continuous belt;
 one or more second rails secured to said frame generally parallel to said second continuous belt and extending substantially the length of said second continuous belt; and
 means for forcing air from said first rails toward said first belt and for forcing air from said second rails toward said second belt.

* * * * *

UNITED STATES PATENT AND TRADEMARK OFFICE
CERTIFICATE OF CORRECTION

PATENT NO. : 5,238,382

DATED : August 24, 1993

INVENTOR(S) : Donald E. Weder

It is certified that error appears in the above-identified patent and that said Letters Patent is hereby corrected as shown below:

Column 4, Line 9; after 16, please delete engage and substitute therefore--engages.

Column 7, Line 42; after cylinder, please delete 8 and substitute therefore--80.

Column 8, Line 67; after portion, please delete 13B and substitute therefore--138.

Column 10, Line 55; after belt, please delete 22 and substitute therefore--226.

Column 12, Line 43; after material, please delete 1 and substitute therefore--12.

Column 14, Line 17; after cylinder, please delete 9B and substitute therefore--98.

Column 18, Line 26; before upon, please delete disposed and substitute therefore--positioned.

Signed and Sealed this

Twenty-eighth Day of June, 1994

Attest:

BRUCE LEHMAN

*Attesting Officer*            *Commissioner of Patents and Trademarks*

UNITED STATES PATENT AND TRADEMARK OFFICE
CERTIFICATE OF CORRECTION

PATENT NO. : 5,238,382

DATED : August 24, 1993

INVENTOR(S) : Weder et al.

Page 1 of 6

It is certified that error appears in the above-identified patent and that said Letters Patent is hereby corrected as shown below:

In the drawings, please add the reference numeral --165-- to Figure 1 as indicated below.

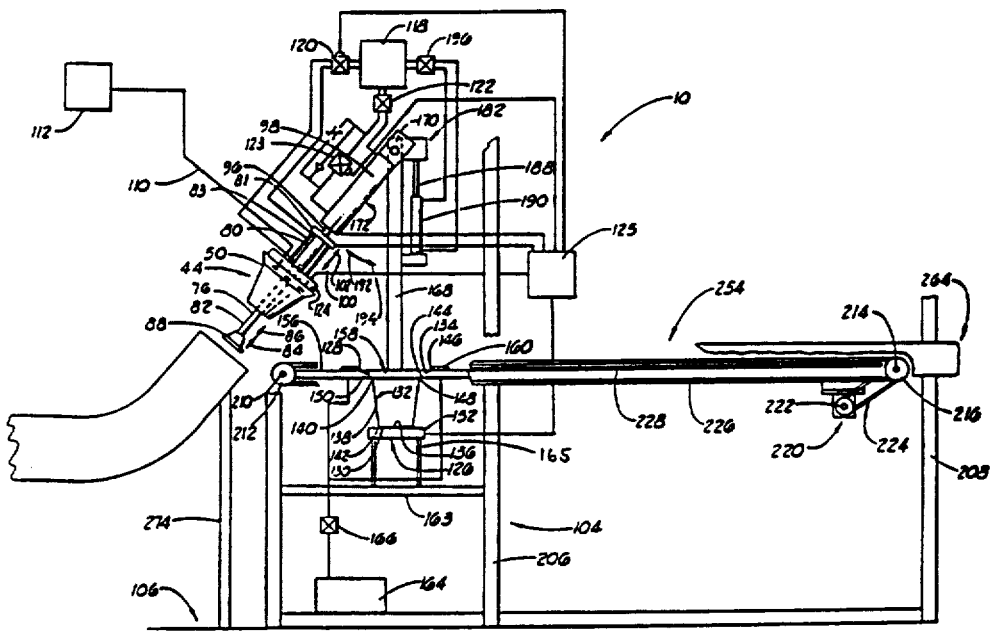

FIG. 1

UNITED STATES PATENT AND TRADEMARK OFFICE
CERTIFICATE OF CORRECTION

PATENT NO. : 5,238,382
DATED : August 24, 1993
INVENTOR(S) : Weder et al.

It is certified that error appears in the above-indentified patent and that said Letters Patent is hereby corrected as shown below:

In the drawings, please add the reference numeral --95-- to Figure 1A as indicated below.

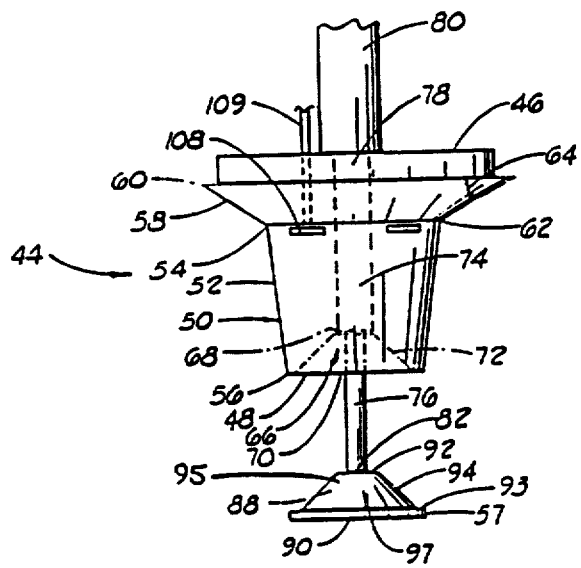

UNITED STATES PATENT AND TRADEMARK OFFICE
CERTIFICATE OF CORRECTION

PATENT NO. : 5,238,382

DATED : August 24, 1993

INVENTOR(S) : Weder et al.

It is certified that error appears in the above-identified patent and that said Letters Patent is hereby corrected as shown below:

Column 2, line 3, please delete "easter" and substitute therefor -- Easter --.

Column 4, line 3, please delete "close" and substitute therefor -- closed --.

Column 7, lines 19-20, please delete "outer peripheral surface 99" and substitute therefor -- outer peripheral surface 57 --.

Column 8, line 9, please delete "Sensor 127," and substitute therefor -- A sensor, --.

Column 8, line 14, please delete "switch 123" and substitute therefor -- control valve 123 --.

Column 8, line 15, please delete "restricted orfice 129" and substitute therefor -- restricted orifice --.

Column 10, line 59, please delete "and" and substitute therefor -- or --.

Column 10, line 64, please delete "crossrods 209 and 211" and substitute therefor -- crossrods 210 and 214 --.

Column 11, line 13, please delete "a" before "material".

UNITED STATES PATENT AND TRADEMARK OFFICE
CERTIFICATE OF CORRECTION

PATENT NO. : 5,238,382

DATED : August 24, 1993

INVENTOR(S) : Weder et al.

It is certified that error appears in the above-identified patent and that said Letters Patent is hereby corrected as shown below:

Column 12, line 11, please delete "rails 201 and 204" and substitute therefor --rails 200 and 201--.

Column 12, line 12, please delete "tends" and substitute therefor -- tend --.

Column 12, line 13, please delete "material 14" and substitute therefor -- material 12 --.

Column 12, line 15, please delete "material 14" and substitute therefor -- material 12 --.

Column 12, line 20, please delete "rail 201 to rail 203" and subsitute therefor -- rail 200 to rail 201 --.

Column 12, line 20, please delete "FIG. 2" and substitute therefor -- FIG. 12 --.

Column 12, line 29, please delete "motor 222" and substitute therefor -- motor 220 --.

Column 12, line 35, please delete "motor 222" and substitute therefor -- motor 220 --.

Column 12, line 36, please delete "motor 222" and substitute therefor -- motor 220 --.

UNITED STATES PATENT AND TRADEMARK OFFICE
CERTIFICATE OF CORRECTION

PATENT NO. : 5,238,382

DATED : August 24, 1993

INVENTOR(S) : Weder et al.

It is certified that error appears in the above-identified patent and that said Letters Patent is hereby corrected as shown below:

Column 13, line 2, please delete "end 288" and substitute therefor -- edge 288 --.

Column 13, lines 55-56, please delete "The control valve 116" and substitute therefor -- A control valve (not shown) --.

Column 14, line 1, please delete "object" and substitute therefor -- sheet --.

Column 14, line 23, please delete "female die 94" and substitute therefor -- female die 126 --.

Column 15, line 66, please delete "the blower 114" and substitute therefor -- a blower --.

Column 15, line 67, please delete "valve 116" and substitute therefor -- valve (not shown) --.

Column 16, line 27, please delete "228" and substitute therefor -- 226 --.

Column 17, line 2, please delete "moving belt 326" and substitute therefor -- moving belt 226 --.

Column 17, line 3, please delete "is" and substitute therefor -- are --.

UNITED STATES PATENT AND TRADEMARK OFFICE
CERTIFICATE OF CORRECTION

PATENT NO. : 5,238,382

DATED : August 24, 1993

INVENTOR(S) : Weder et al.

It is certified that error appears in the above-identified patent and that said Letters Patent is hereby corrected as shown below:

Column 17, line 4, please delete "is" and substitute therefor -- are --.

Column 17, line 4, please delete "moving belt 326" and substitute therefor -- moving belt 226 --.

Signed and Sealed this

Twenty-third Day of January, 1996

Attest:

BRUCE LEHMAN

Attesting Officer    Commissioner of Patents and Trademarks